United States Patent
Park

(10) Patent No.: US 11,196,590 B2
(45) Date of Patent: Dec. 7, 2021

(54) CLOUD NETWORK ARCHITECTURE

(71) Applicant: NHN Entertainment Corporation, Seongnam-si (KR)

(72) Inventor: Seong Woo Park, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 142 days.

(21) Appl. No.: 16/158,785

(22) Filed: Oct. 12, 2018

(65) Prior Publication Data
US 2019/0116061 A1    Apr. 18, 2019

(30) Foreign Application Priority Data

Oct. 13, 2017 (KR) ........................ 10-2017-0133034

(51) Int. Cl.
*H04L 12/46* (2006.01)
*H04L 12/931* (2013.01)
*H04L 12/713* (2013.01)
*H04L 12/715* (2013.01)
*H04L 29/06* (2006.01)
(Continued)

(52) U.S. Cl.
CPC ...... *H04L 12/4645* (2013.01); *G06F 9/45558* (2013.01); *H04L 12/4633* (2013.01); *H04L 45/04* (2013.01); *H04L 45/586* (2013.01); *H04L 45/64* (2013.01); *H04L 45/74* (2013.01); *H04L 49/354* (2013.01); *H04L 49/70* (2013.01); *H04L 63/0272* (2013.01); *H04L 63/162* (2013.01); *G06F 2009/45595* (2013.01); *H04L 67/10* (2013.01)

(58) Field of Classification Search
None
See application file for complete search history.

(56) References Cited

U.S. PATENT DOCUMENTS 8,369,333 B2   2/2013   Hao et al.
9,160,609 B2   10/2015  Dunbar et al.
(Continued)

FOREIGN PATENT DOCUMENTS

KR   10-2012-0056300   6/2012
KR   10-2014-0099464   8/2014
(Continued)

*Primary Examiner* — Mohammad S Adhami
(74) *Attorney, Agent, or Firm* — H.C. Park & Associates, PLC

(57) ABSTRACT

A computer device forms a scope controller for a cloud network, including: memory configured to store a computer-readable instruction; and at least one processor configured to execute the instruction, wherein the cloud network may include: hypervisors classified as a plurality of scopes including a first scope; and virtual machines generated by the hypervisors, wherein the at least one processor is configured to: switch, using a virtual switch of the scope controller, a packet communicated between virtual machines generated by hypervisors classified as the first scope, and a packet received from an outside of the first scope, and route, using a virtual router of the scope controller, a packet communicated between the scope controller and a router for connecting to an outside of the cloud network, and a packet communicated between the scope controller and a different scope controller assigned to a different scope other than the first scope.

13 Claims, 10 Drawing Sheets

(51) Int. Cl.
*G06F 9/455* (2018.01)
*H04L 12/741* (2013.01)
*H04L 29/08* (2006.01)

(56) References Cited

U.S. PATENT DOCUMENTS

| | | |
|---|---|---|
| 9,331,940 B2 | 5/2016 | Balus et al. |
| 2013/0142201 A1 | 6/2013 | Kim et al. |
| 2015/0301847 A1* | 10/2015 | Silva .................. G06F 9/45558 718/1 |
| 2018/0205673 A1* | 7/2018 | Jain ........................ H04L 49/70 |
| 2018/0210750 A1* | 7/2018 | Cui ..................... H04L 41/0806 |

FOREIGN PATENT DOCUMENTS

| | | |
|---|---|---|
| KR | 10-1477153 | 12/2014 |
| KR | 10-2015-0038450 | 4/2015 |
| KR | 10-1621717 | 5/2016 |

\* cited by examiner

CLOUD NETWORK ARCHITECTURE

CROSS REFERENCE TO RELATED APPLICATION

This application claims priority from and the benefit of Korean Patent Application No. 10-2017-0133034 filed on Oct. 13, 2017, which is hereby incorporated by reference for all purposes as if fully set forth herein.

BACKGROUND

Field

Exemplary embodiments of the invention relate generally to cloud network architecture and, more specifically, to a cloud network system for improving the limit of scalability, a scope controller included in the cloud network system, an operating method of the scope controller, a computer program coupled to a computer and stored in a computer-readable recording medium in order to execute the operating method in a computer, and a recording medium for the computer program.

Discussion of the Background

A cloud network is a computer network that is located within cloud computing infrastructure or part of cloud computing infrastructure, and it is a computer network that provides a network interconnection function between a cloud-based or cloud-supporting application program, service and solution. Korean Patent Application Publication No. 10-2014-0099464 is a technology regarding a public cloud and on-premise network connection scheme, and discloses a technology for receiving and encapsulating a packet to identify a tenant within a designated virtual network for a customer based on a virtual local area network (VLAN) tag.

The above information disclosed in this Background section is only for understanding of the background of the inventive concepts, and, therefore, it may contain information that does not constitute prior art.

SUMMARY

Devices constructed according to exemplary embodiments of the invention are capable of providing a cloud network system including a scope controller for improving the limit of scalability in the existing cloud network, and an operating method of the scope controller.

Additional features of the inventive concepts will be set forth in the description which follows, and in part will be apparent from the description, or may be learned by practice of the inventive concepts.

According to one or more embodiments of the invention, a computer device forms a scope controller for a cloud network, the computer device including: memory configured to store a computer-readable instruction; and at least one processor configured to execute the instruction, wherein the cloud network may include: hypervisors classified as a plurality of scopes including a first scope; and virtual machines generated by the hypervisors, wherein the at least one processor is configured to: switch, using a virtual switch of the scope controller, a packet communicated between virtual machines generated by hypervisors classified as the first scope, and a packet received from an outside of the first scope, and route, using a virtual router of the scope controller, a packet communicated between the scope controller and a router for connecting to an outside of the cloud network, and a packet communicated between the scope controller and a different scope controller assigned to a different scope other than the first scope.

The at least one processor may be configured to process a data link layer communication between the virtual machines and a data link layer communication between internal tenants within the first scope, through the virtual machines over a virtual local area network (VLAN) using the virtual switch.

The at least one processor may be configured to process a network layer communication between the scope controller and the different scope controller over a virtual extensible LAN (VxLAN) between a virtual router included in the scope controller and a virtual router included in the different scope controller.

According to one or more embodiments of the invention, a cloud network system, including: a router for a connection with an outside of a cloud network; hypervisors classified into a plurality of scopes; and scope controllers assigned to the plurality of scopes, respectively, each scope controllers being configured to route packets transmitted and received within a scope, packets communicated between scopes, and packets communicated between a scope and the router for connecting to the outside of the cloud network.

Each of the scope controllers may include: a virtual switch configured to switch a data link layer communication for packets communicated between virtual machines generated by hypervisors classified as a corresponding scope and a data link layer communication for delivering a packet received from an outside of the corresponding scope to at least one of the virtual machines generated by the hypervisors classified as the corresponding scope; and a virtual router configured to route a network layer communication between the corresponding scope and a different scope other than the corresponding scope and a network layer communication between the corresponding scope and the router for connecting to the outside of the cloud network.

According to one or more embodiments of the invention, an operating method of a scope controller for a cloud network, the method including: receiving a packet; determining whether the packet is: a first packet received from one virtual machine generated by hypervisors classified as a first scope among hypervisors classified into a plurality of scopes; or a second packet received from an outside of the first scope; delivering, in response to determining that the packet is the first packet, the received first packet to an inside or outside of the first scope based on a scope of an end point of the received first packet; and delivering, in response to determining that the packet is the second packet, the received second packet to the inside of the first scope.

The delivering of the received first packet may include: identifying the scope of the end point of the received first packet through an end point database of the scope controller; switching, in response to identifying that the end point of the received first packet is the first scope, the received first packet to a virtual machine of the first scope corresponding to the end point using a virtual switch of the scope controller; and routing, in response to identifying that the end point of the received first packet is a different scope other than the first scope or the outside of the cloud network, the received first packet to the different scope or a router for a connection with the outside of the cloud network using a virtual router of the scope controller.

The delivering of the received second packet may include switching the received second packet to one of the virtual machines using a virtual switch of the scope controller.

The first packet may include a packet in a data link layer, and the second packet may include a packet in a network layer.

Communication of the data link layer is isolated and processed within each of the plurality of scopes.

A computer-readable recording medium including a program code which, when executed, is configured to perform the method of a scope controller for a cloud network in a computer.

In an exemplary embodiment, the at least one processor may be configured to process communication of a data link layer between the virtual machines or communication of a data link layer between internal tenants of the first scope formed through the virtual machines over a virtual local area network (VLAN) using the virtual switch.

In another exemplary embodiment, the at least one processor may be configured to process communication of a network layer between the scope controller and the different scope controller over a virtual extensible LAN (VxLAN) between a virtual router included in the scope controller and a virtual router included in the different scope controller.

In yet another exemplary embodiment, communication of a data link layer may be isolated and processed within each of the plurality of scopes.

There is provided a cloud network system, including a router for a connection with the outside of a cloud network, hypervisors classified into a plurality of scopes, and scope controllers assigned to the plurality of scopes, respectively, and each configured to route packets transmitted and received within a scope, packets transmitted and received between scopes and packets transmitted and received between a scope and the router for the connection with the outside of the cloud network.

There is provided an operating method of a scope controller for a cloud network, including receiving a first packet from one of virtual machines generated by hypervisors classified as a first scope from among hypervisors classified into a plurality of scopes or a second packet from the outside of the first scope, delivering the received first packet to the inside or outside of the first scope based on the scope of an end point of the received first packet when the first packet is received, and delivering the second packet to the inside of the first scope when the second packet is received.

There is provided a computer program coupled to a computer and stored in a computer-readable recording medium in order to execute the operating method of the scope controller in a computer.

There is provided a computer-readable recording medium in which a program for executing the operating method of the scope controller in a computer has been written.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
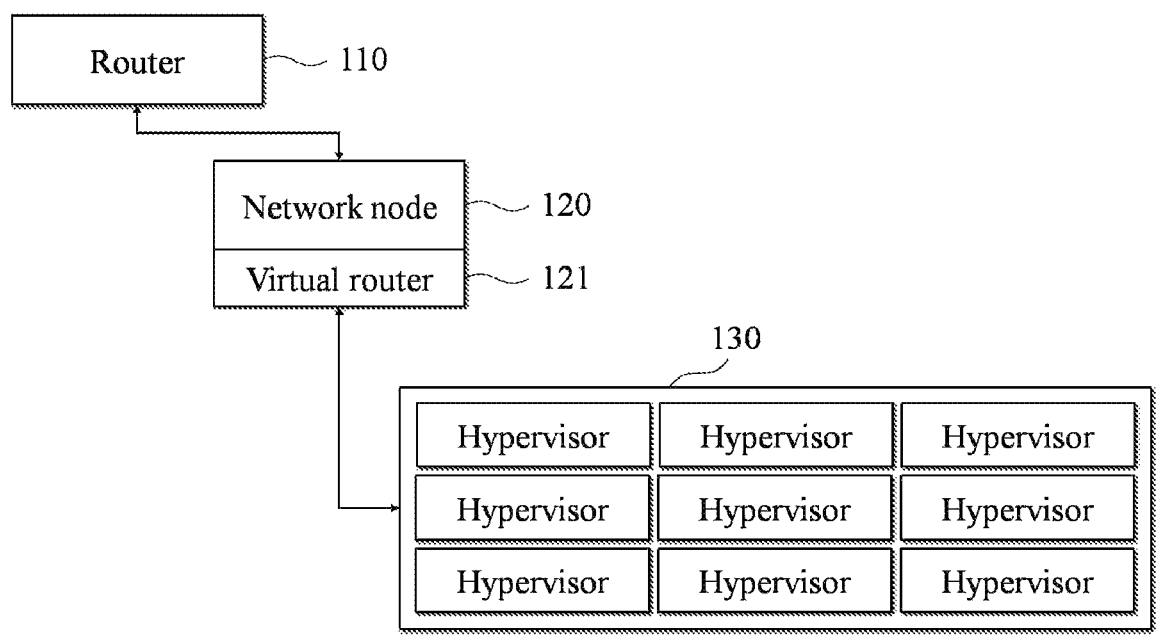
FIGS. 1 and 2 are diagrams showing examples of a centralized virtual router (CVR) cloud network environment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments are described in detail with reference to the accompanying drawings.

Figure 2:
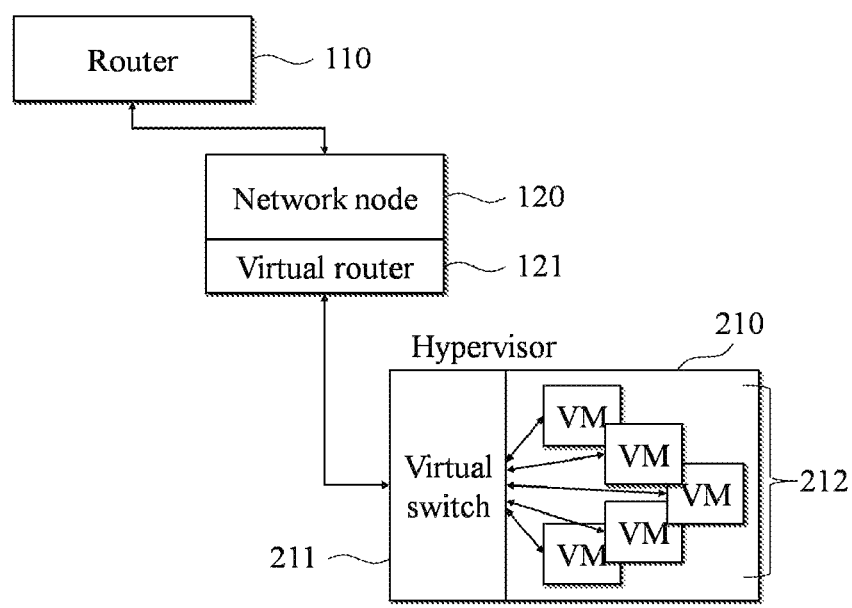

FIGS. 1 and 2 are diagrams showing examples of a centralized virtual router (CVR) cloud network environment.

FIG. 1 shows a router 110, a network node 120 and a plurality of hypervisors 130. Furthermore, FIG. 2 shows the internal configuration of the router 110, the network node 120 and one hypervisor 210 of the plurality of hypervisors 130 shown in FIG. 1. In such a CVR configuration, the network node 120 may include a virtual router 121. The hypervisor 210 may include a virtual switch 211 and a plurality of virtual machines (VMs) 212. In this case, each of the plurality of hypervisors 130 may have the same or similar configuration as the hypervisor 210.

The plurality of VMs 212 of the hypervisor 210 may perform communication through the virtual switch 211 of the hypervisor 210. Furthermore, communication between the internal tenants of the hypervisor 210 may be internally performed by the virtual switch 211 of the hypervisor 210. Communication for outgoing traffic may be performed using the virtual router 121 of the network node 120.

Such a CVR configuration is a simple and centralized method and has an advantage in that traffic can be smoothly managed. However, such a CVR configuration has a problem in that an obstacle may generally occur when an obstacle occurs in the network node 120 because communication for traffic with the outside is performed through the network node 120. In other words, an obstacle point may be concentrated. Furthermore, there are problems in that distributed processing is difficult because a load of the network node 120 increases as new hypervisors increase and thus scalability is limited.

Figure 3:
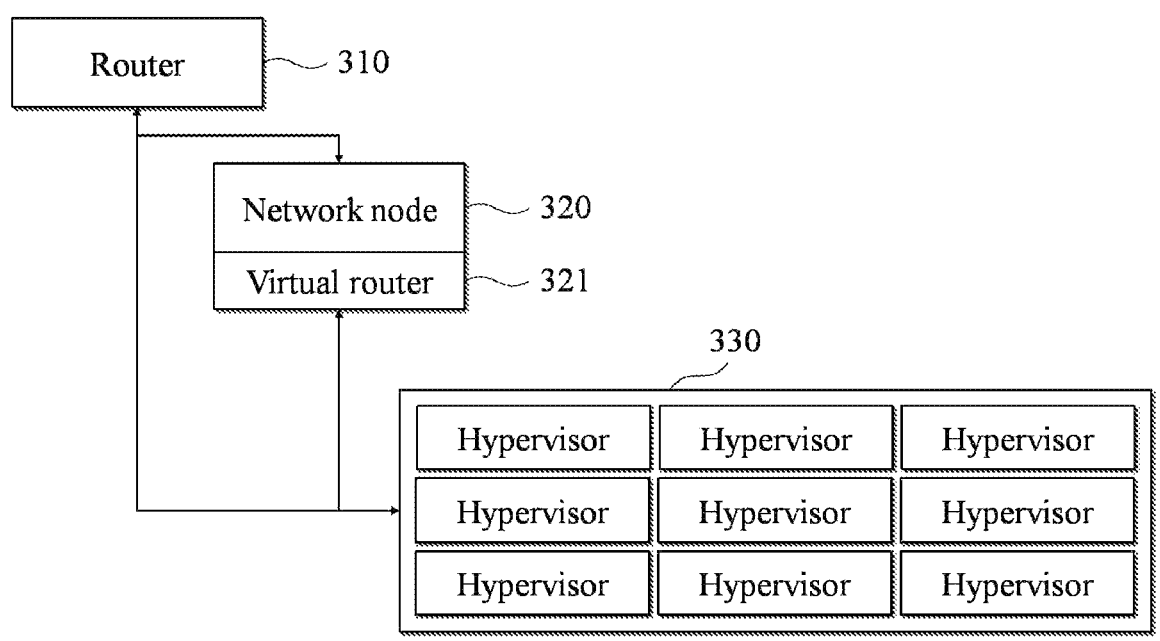
FIGS. 3 and 4 are diagrams showing examples of a distributed virtual router (DVR) cloud network environment.
Figure 4:
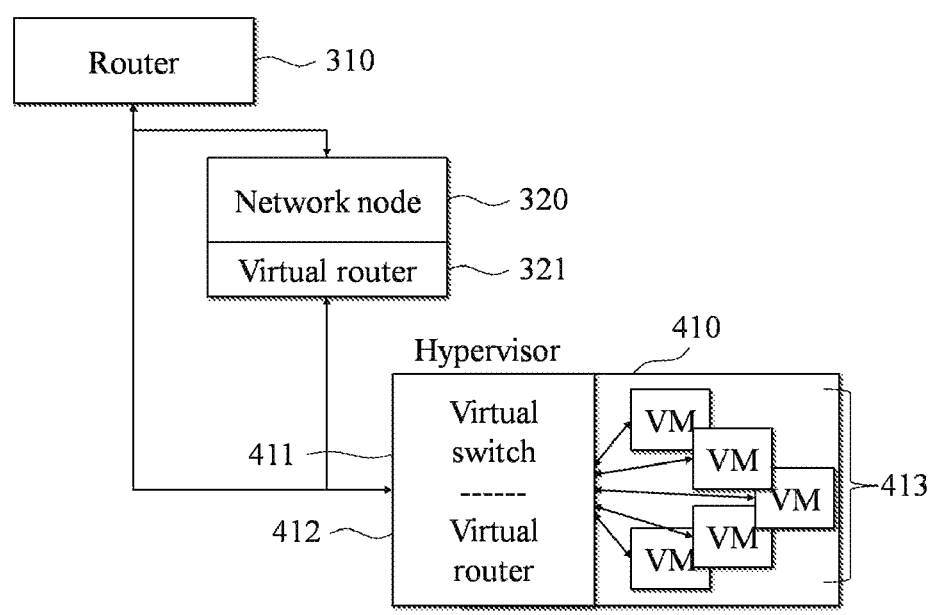

FIGS. 3 and 4 are diagrams showing examples of a distributed virtual router (DVR) cloud network environment.

FIG. 3 shows a router 310, a network node 320 and a plurality of hypervisors 330. Furthermore, FIG. 4 shows the internal configuration of the router 310, the network node 320 and one hypervisor 410 of the plurality of hypervisors 330 shown in FIG. 3. In such a DVR configuration, the network node 120 may include a virtual router 321. The hypervisor 410 may include a virtual switch 411, a virtual router 412 and a plurality of VMs 413. In this case, each of the plurality of hypervisors 330 may have the same or similar configuration as the hypervisor 410.

The plurality of VMs 413 of the hypervisor 410 may perform communication through the virtual switch 411 of the hypervisor 410. Furthermore, in such a DVR configuration, similar to the CVR configuration, communication between the internal tenants of the hypervisor 410 may be internally performed by the virtual switch 411 of the hypervisor 410. On the other hand, in the DVR configuration, compared to the CVR configuration, an IP address for communication with the outside may be assigned to at least some of the plurality of hypervisors 330. In a hypervisor to which an IP address has been assigned, communication for outgoing traffic may be performed by the virtual router 412 of the hypervisor 410 not the virtual router 321 of the network node 320. In contrast, in a hypervisor to which an IP address for communication with the outside has not been assigned, from among the plurality of hypervisors 330, communication may be performed on outgoing traffic using the virtual router 321 of the network node 320.

In such a DVR configuration, a problem occurs only in some pieces of equipment to which an IP address has not been assigned because a hypervisor to which an IP address has been assigned performs communication with the outside using a virtual router (e.g., the virtual router 412 of the hypervisor 410) included in the corresponding hypervisor although an obstacle occurs in the network node 320. Furthermore, the DVR configuration has an advantage in that an obstacle can be easily overcome because the routers have a distributed form. In contrast, the DVR configuration has a problem in that communication efficiency of a data link layer (Layer 2 or L2) is low because the routers are spread over the entire network. Furthermore, there is a problem in that scalability is limited because performance is greatly deteriorated as the number of VMs increases.

Figure 5:
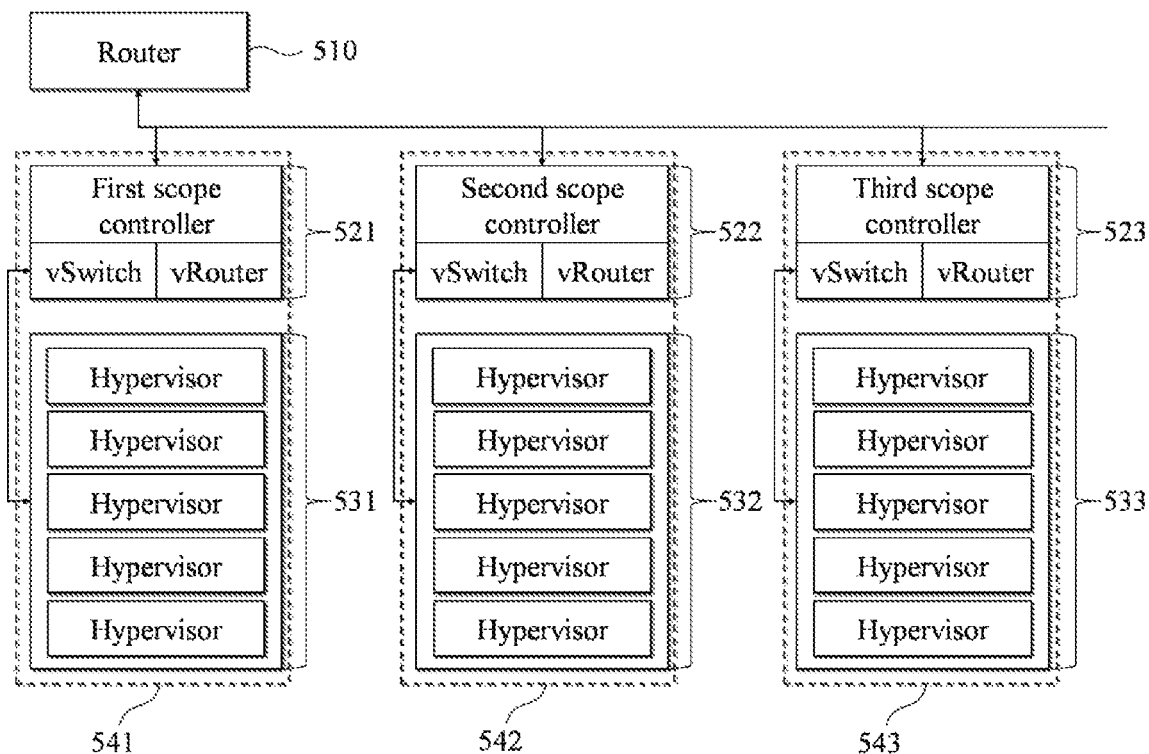
FIGS. 5, 6, and 7 are diagrams showing examples of a scoped virtual router (SVR) cloud network environment according to an exemplary embodiment.
Figure 6:
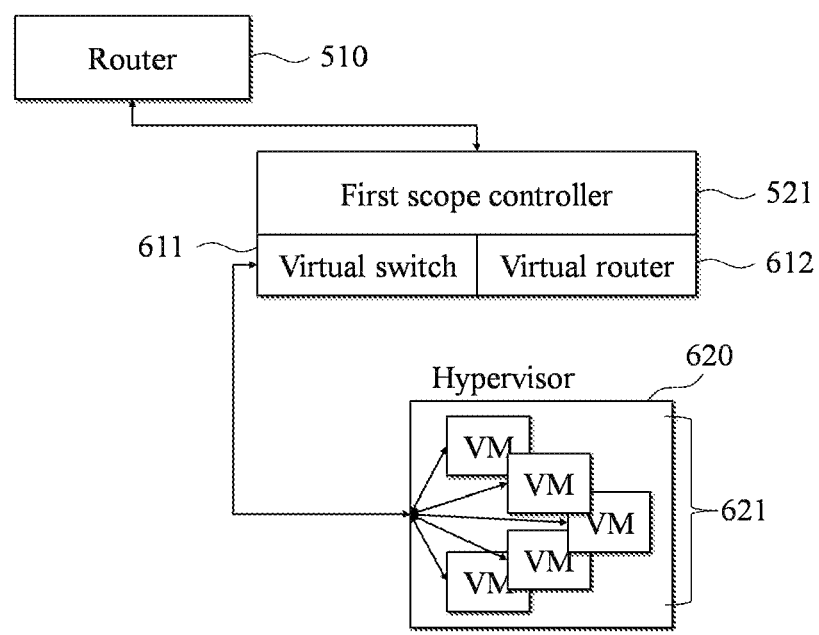
Figure 7:
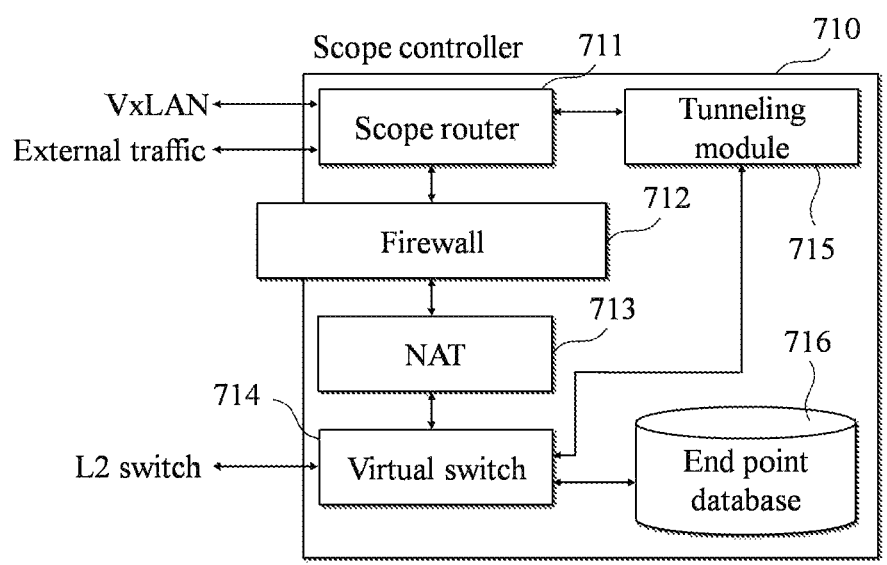

FIGS. 5, 6, and 7 are diagrams showing examples of a scoped virtual router (SVR) cloud network environment according to an exemplary embodiment.

FIG. 5 shows a router 510, a plurality of scope controllers 521, 522, and 523 and a plurality of hypervisors 531, 532, and 533. In the cloud network system according to exemplary embodiments, the plurality of hypervisors 531, 532, and 533 may be classified into a plurality of scopes. One scope controller may be allocated to a plurality of scopes. For example, in FIG. 5, a first dotted-line box shows that the first scope controller 521 and five hypervisors 531 form a first scope 541. A second dotted-line box shows that the second scope controller 522 and five hypervisors 532 form a second scope 542. A third dotted-line box shows that the third scope controller 523 and five hypervisors 533 form a third scope 543. Each of the plurality of scope controllers 521, 522, and 523 may control the communication of the hypervisors of a scope allocated thereto. To this end, each scope controller may include a virtual switch and a virtual router. In this case, communication inside the scope may be performed using L2 communication, and communication outside the scope may be performed using communication of a network layer (Layer 3, or L3). FIG. 5 shows an example in which the three scopes are included and five hypervisors are included in each of the three scopes. However, the exemplary embodiments are not limited thereto, and the number of scopes or the number of hypervisors included in each scope is not limited. In such a configuration, scalability is easy because L2 communication has been isolated as communication inside the scope.

FIG. 6 shows the router 510, the first scope controller 521, and a hypervisor 620 belonging to the first scope 541. In this case, the first scope controller 521 may include a virtual switch 611 and a virtual router 612. Communication between VMs 621 generated in the hypervisor 620 may be processed through L2 communication without the intervention of the hypervisor 620. Communication between tenants within the hypervisor 620 may be processed by an L2 switch (i.e., virtual switch 611) within a corresponding scope over a virtual local area network (VLAN). In other words, the first scope controller 521 may switch L2 communication for packets transmitted and received between VMs within the scope and L2 communication for delivering a packet received by the first scope controller 521 from the outside of the scope to at least one of the VMs using the virtual switch 611. Communication between the same tenants outside the scope may be processed over a virtual extensible LAN (VxLAN). Outgoing traffic may be processed through the virtual router 612 of the scope controller 521. Furthermore, communication toward another scope may also be processed through the virtual router 612. In other words, the first scope controller 521 may route L3 communication for packets transmitted and received between the first scope controller 521 and another scope controller and L3 communication for packets transmitted and received between the first scope controller 521 and the router 510 for a connection with the outside of a cloud network through the virtual router 612.

Performance of each hypervisor can be improved because the hypervisor 620 does not need to include a virtual switch like the hypervisor of the CVR configuration (e.g., the hypervisor 210 described with reference to FIG. 2) and does not need to include a virtual switch and a virtual router like the hypervisor of the DVR configuration (e.g., the hypervisor 410 described with reference to FIG. 4).

Furthermore, the exemplary embodiment may have advantages in that an obstacle occurs in one scope controller may only affect the equipment of a corresponding scope, and no obstacle occurs in all of pieces of equipment and pieces of equipment of between different scopes disposed territorially separated may normally operate since a VLAN is only used for communication within a scope and communication between the same tenants between different scopes is processed over a VxLAN.

FIG. 7 is an exemplary embodiment for illustrating the internal configuration of a scope controller 710, and shows an example in which the scope controller 710 includes a scope router 711, a firewall 712, a network address translator (NAT) 713, a virtual switch 714, a tunneling module 715 and an end point database 716.

The scope router 711 may correspond to the aforementioned virtual router 612 and process communication for external traffic through communication with the router 510 described with reference to FIGS. 5 and 6. Furthermore, the scope router 711 may operate to process communication with the same tenant outside a scope over a VxLAN. Flexible IPs are spread in the entire hypertext, and thus overall broadcasting is increased because the number of end points is many from a network viewpoint. Accordingly, a scope router may be present in each scope. The scope router 711 of FIG. 7 may manage the flexible IPs of VMs using a flexible IP table. In such a case, an address resolution protocol (ARP) entry for the flexible IPs can be maintained to a maximum.

The firewall 712 may be a system for blocking unauthorized access to a communication network from the outside a scope to the inside of the scope or the inside of a scope to the outside of the scope. The utilization of the firewall 712 may be easily understood by a person having ordinary skill in the art through already well-known technologies.

The NAT 713 may be a system for converting an external IP address into an internal IP address or an internal IP address into an external IP address. The utilization of the NAT 713 may be easily understood by a person having ordinary skill in the art through already well-known technologies.

The virtual switch 714 may deliver a packet to an L2 switch. As described above, communication between internal tenants may be processed by the L2 switch within a scope over a VLAN. Furthermore, if the external IP address of an externally fetched packet is converted into an internal IP address through the NAT 713, the packet converted into the internal IP address may also be delivered to the L2 switch and delivered to the target VM of the packet through the L2 switch.

The tunneling module 715 may be used to tunnel a packet for L2 communication in order to deliver the packet to a different scope or the outside using L3 communication. Tunneling is a technology for encapsulating a network protocol within packets transported over a network in order to transmit data through access from one network to the other network. The utilization of the tunneling module 715 may also be easily understood by a person having ordinary skill in the art through already well-known technologies.

The end point database 716 may store and manage information regarding that the target VM of a packet is positioned in which scope. For example, the virtual switch 714 may determine information regarding that a received packet will be delivered to which scope based on information stored in the end point database 716.

Figure 8:
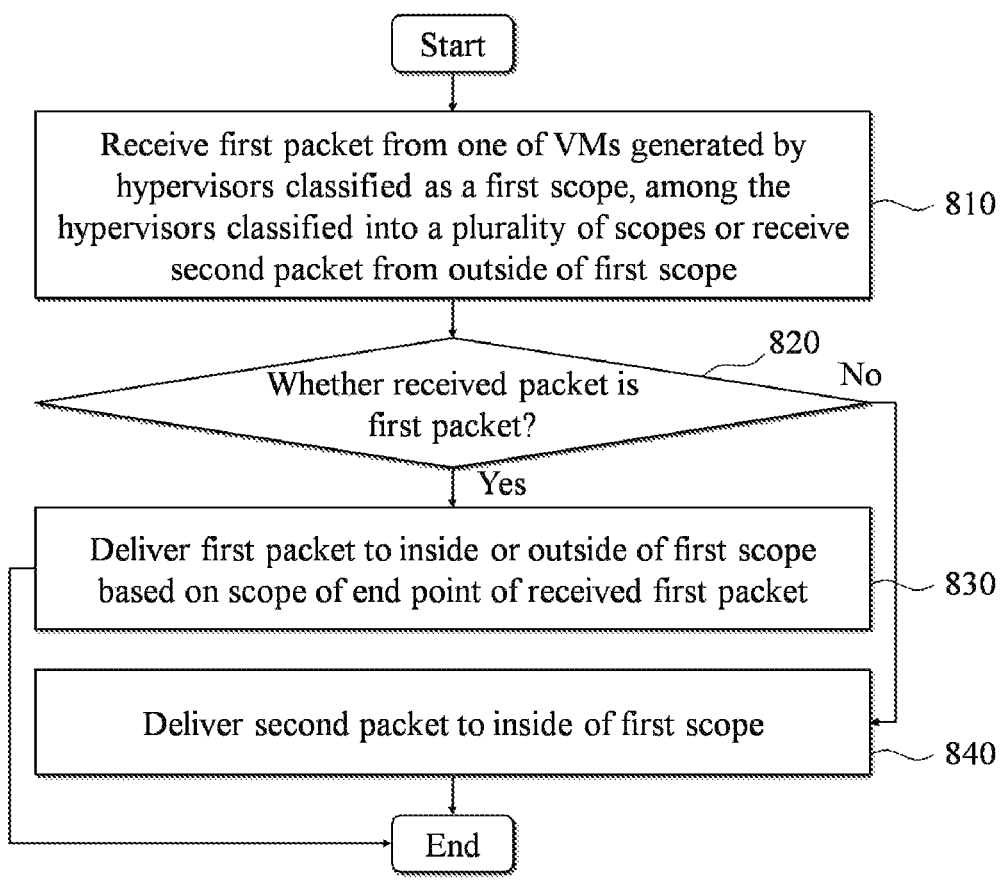
FIG. 8 is a flowchart showing an example of an operating method of a scope controller according to an exemplary embodiment.

FIG. 8 is a flowchart showing an example of an operating method of the scope controller according to an exemplary embodiment. The scope controller according to the present exemplary embodiment may be configured using a computer device. The operating method of the scope controller according to the present exemplary embodiment may be substantially performed by a computer device.

In step 810, the computer device may receive a first packet from one of VMs generated by hypervisors classified as a first scope, among the hypervisors classified into a plurality of scopes, or may receive a second packet from the outside of the first scope. The first packet may be a packet of the data link layer delivered from the outside of the first scope to the scope controller. The second packet may be a packet of the network layer delivered from the outside of the first scope to the scope controller.

In step 820, the computer device may identify whether the received packet is the first packet or the second packet. The computer device may perform step 830 if the received packet is the first packet, and may perform step 840 if the received packet is the second packet.

In step 830, the computer device may deliver the first packet to the inside or outside of the first scope based on the scope of the end point of the received first packet. The delivery of the first packet is described more specifically with reference to FIG. 9.

In step 840, the computer device may deliver the second packet to the inside of the first scope. In this case, the computer device may switch the received second packet to one of the VMs of the first scope using the virtual switch of the scope controller. The delivery of the second packet through such switching may be performed through L2 communication (e.g., VLAN).

Figure 9:
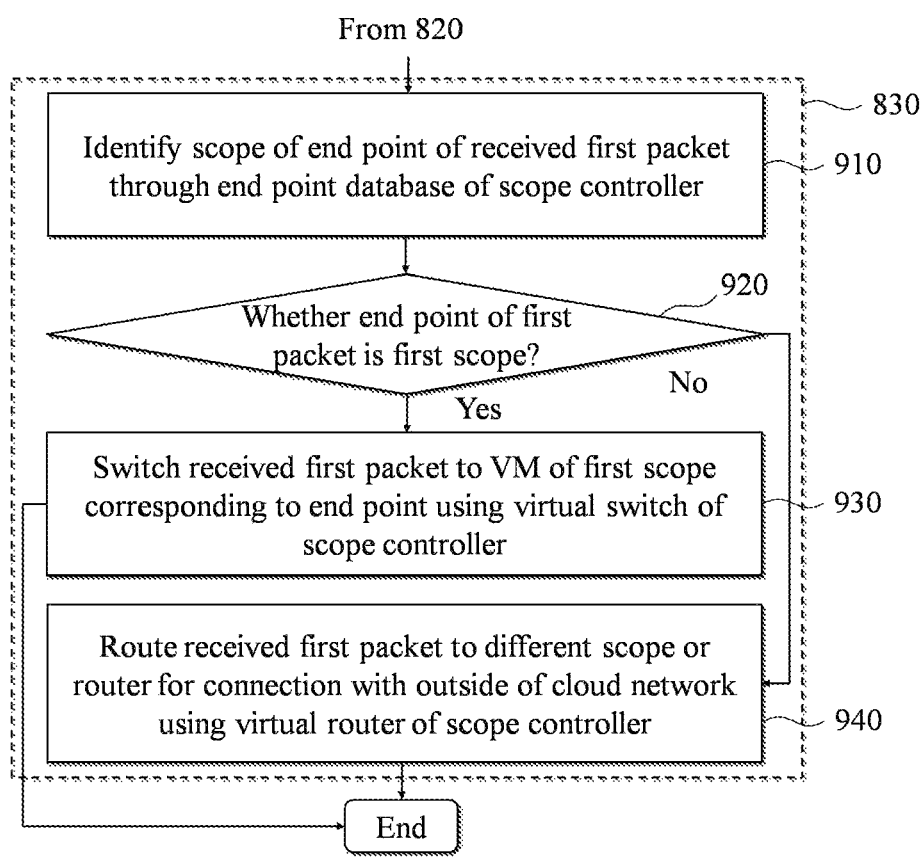
FIG. 9 is a flowchart showing an example of a process of processing a first packet in one exemplary embodiment.

FIG. 9 is a flowchart showing an example of a process of processing the first packet in one exemplary embodiment. Steps 910, 920, 930, and 940 of FIG. 9 may be included in step 830 of FIG. 8 and performed.

In step 910, the computer device may identify the scope of the end point of the received first packet through the end point database of the scope controller. In this case, the end point database may correspond to the end point database 716 of FIG. 7.

In step 920, the computer device may identify whether the end point of the first packet is the first scope. The computer device may perform step 930 if the end point of the first packet is the first scope and may perform step 940 if the end point of the first packet is a different scope other than the first scope or outside of a cloud network.

In step 930, the computer device may switch the received first packet to a VM of the first scope corresponding to the end point using the virtual switch of the scope controller. If the end point of the first packet is the first scope, it may mean internal communication within the first scope (e.g., communication between VMs of the first scope or communication between internal tenants of the first scope). Accordingly, the computer device may deliver the first packet to a target VM through L2 communication using the virtual switch (e.g., communication using a VLAN).

In step 940, the computer device may route the received first packet to a different scope or a router for a connection with the outside of a cloud network using the virtual router of the scope controller. If the end point of the first packet is a VM (or tenant) included in a different scope other than the first scope or outside of the cloud network, it may mean that the first packet is delivered to outside of the first scope. In this case, the computer device may route the first packet so that it is delivered to a scope controller allocated to a corresponding scope other than the first scope or may route the first packet to a router (e.g., the router 510 described with reference to FIGS. 5 and 6 in order to deliver the first packet to the outside of the cloud network.

Figure 10:
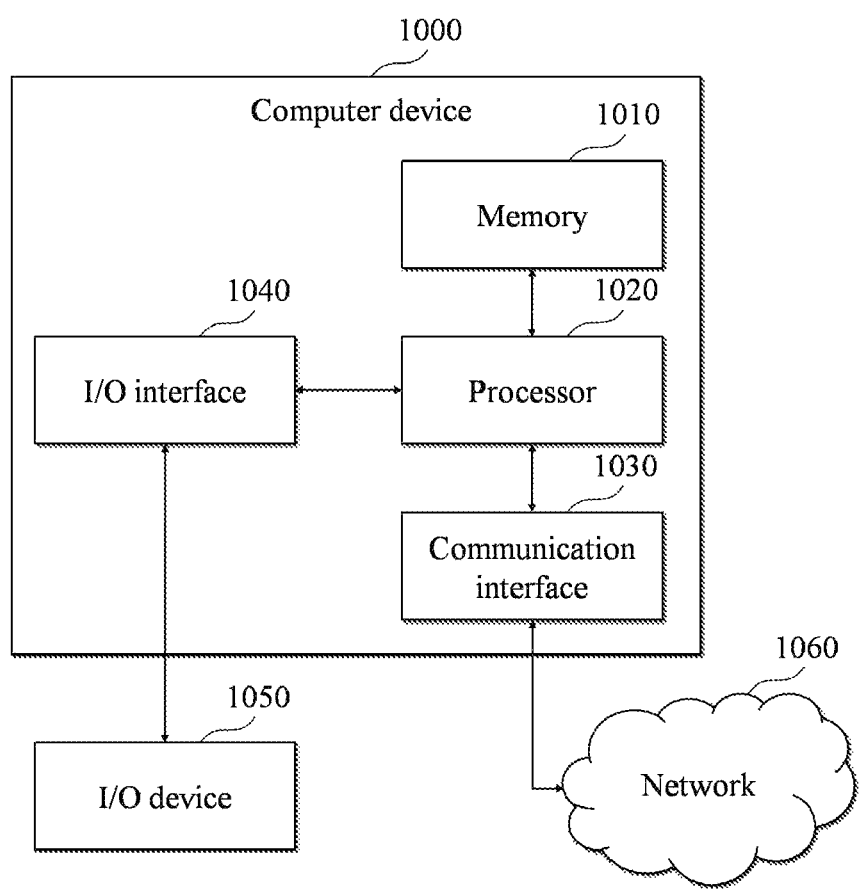
FIG. 10 is a block diagram for illustrating the internal configuration of a computer device in one exemplary embodiment.

FIG. 10 is a block diagram for illustrating the internal configuration of a computer device in one exemplary embodiment. The computer device 1000 may include memory 1010, a processor 1020, a communication interface 1030 and an input/output (I/O) interface 1040. The memory 1010 is a computer-readable recording medium, and may include random access memory (RAM) and a permanent mass storage device, such read only memory (ROM) and a disk drive. In this case, the permanent mass storage device, such as ROM and a disk drive, is a separate permanent storage device different from the memory 1010 and may be included in the computer device 1000. Furthermore, the memory 1010 may store an operating system and at least one program code. Such software elements may be loaded from a separate computer-readable recording medium different from the memory 1010 to the memory 1010. The separate computer-readable recording medium may include computer-readable recording media, such as a floppy drive, a disk, a tape, a DVD/CD-ROM drive and a memory card. In other embodiments, the software elements may be loaded onto the memory 1010 through the communication interface 1030 not a computer-readable recording medium. For example, the software elements may be loaded onto the memory 1010 of the computer device 1000 based on a computer program installed on files received over a network 1060.

The processor 1020 may be configured to process the instructions of a computer program by performing basic arithmetic, logic and I/O operation. The instructions may be provided from the memory 1010 or the communication interface 1030 to the processor 1020. For example, the processor 1020 may be configured to execute received instructions based on program code stored in a recording device, such as the memory 1010.

The communication interface 1030 may provide a function for allowing the computer device 1000 to perform communication with a different device (e.g., the aforementioned storage devices) over the network 1060. For example, a request, instructions, data or a file generated by the processor 1020 of the computer device 1000 based on program code stored in a recording device, such as the memory 1010, may be delivered to other devices over the network 1060 under the control of the communication interface 1030. Conversely, a signal, instructions, data or a file from a different device may be received by the computer device 1000 through the communication interface 1030 of the computer device 1000 over the network 1060. A signal, instructions or data received through the communication interface 1030 may be delivered to the processor 1020 or the memory 1010. A file received through the communication interface 1030 may be stored in a storage medium (e.g., the aforementioned permanent storage device) that may be further included in the computer device 1000.

The I/O interface 1040 may be means for an interface with an I/O device 1050. For example, the input device may include a device, such as a microphone, a keyboard or a mouse. The output device may include a device, such as a display or a speaker. For another example, the I/O interface 1040 may be means for an interface with a device in which functions for input and output have been integrated into one, such as a touch screen. The I/O device 1050 may be configured as a single device with respect to the computer device 1000.

Furthermore, in other embodiments, the computer device 1000 may include more or less elements than the elements of FIG. 10. However, most of conventional elements do not need to be clearly illustrated. For example, the computer device 1000 may be implemented to include at least some of the I/O device 1050 or may further include other elements, such as a transceiver and a database.

In accordance with the exemplary embodiments, scalability can be increased by isolating the communication area of the data link layer (Layer 2) in a cloud network. Pieces of equipment of a scope unit can operate although they are territorially separated because communication between scopes is performed by the communication area of the network layer (Layer 3).

Performance of a hypervisor can be improved because the hypervisor does not need to include a virtual switch or a virtual router. An obstacle occurred in specific equipment can be prevented from being extended to a general obstacle because communication between scopes or external traffic is processed by the scope controller for each scope.

The aforementioned system or device may be implemented in the form of a combination of hardware components, software components and/or hardware components and software components. For example, the device and components described in the exemplary embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. A processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configuration, such as a parallel processor, is also possible.

Software may include a computer program, code, an instruction or one or more combinations of them and may configure the processing device so that it operates as desired or may instruct the processing device independently or collectively. Software and/or data may be interpreted by the processing device or may be embodied in a machine, component, physical device, virtual equipment or computer storage medium or device of any type or a transmitted signal wave permanently or temporarily in order to provide an instruction or data to the processing device. Software may be distributed to computer systems connected over a network and may be stored or executed in a distributed manner. Software and data may be stored in one or more computer-readable recording media.

The method according to the exemplary embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A computer device forming a scope controller for a cloud network, the computer device comprising:
   memory configured to store computer-readable instructions; and
   at least one processor configured to execute the instructions,
   wherein the scope controller includes a virtual switch and a virtual router therein,
   wherein the cloud network comprises:
      hypervisors classified as a plurality of scopes comprising a first scope, the first scope including the virtual switch and the virtual router and a plurality of first hypervisors of the hypervisors and the first scope being associated with the scope controller, wherein the virtual switch and virtual router are dedicated to the first scope and the plurality of first hypervisors,
      wherein the plurality of first hypervisors are associated with only one virtual switch; and
      virtual machines generated by the hypervisors,
   wherein the at least one processor is configured to:

switch, using the virtual switch of the scope controller, a packet communicated between virtual machines generated by the plurality of first hypervisors included in the first scope associated with the scope controller, and a packet received from an outside of the first scope, and route, using the virtual router of the scope controller, a packet communicated between the scope controller and a router for connecting to an outside of the cloud network, and a packet communicated between the scope controller associated with the first scope and a different scope controller associated with a different scope other than the first scope.

2. The computer device of claim 1, wherein the at least one processor is configured to process a data link layer communication between the virtual machines and a data link layer communication between internal tenants within the first scope, through the virtual machines over a virtual local area network (VLAN) using the virtual switch.

3. The computer device of claim 1, wherein the at least one processor is configured to process a network layer communication between the scope controller and the different scope controller over a virtual extensible LAN (VxLAN) between a virtual router included in the scope controller and a virtual router included in the different scope controller.

4. The computer device of claim 1, wherein communication of a data link layer is isolated and processed within each of the plurality of scopes.

5. A cloud network system, comprising:
a router for a connection with an outside of a cloud network;
hypervisors classified into a plurality of scopes comprising a first scope, the first scope including a virtual switch and a virtual router and a plurality of first hypervisors of the hypervisors and the first scope being associated with a scope controller, wherein the virtual switch and virtual router are dedicated to the first scope and the plurality of hypervisors, wherein the plurality of first hypervisors are associated with only one virtual switch; and
scope controllers assigned to the plurality of scopes, respectively, each of the scope controllers being configured to route packets transmitted and received within a scope, packets communicated between scopes, and packets communicated between a scope and the router for connecting to the outside of the cloud network,
wherein each scope controller includes the virtual switch and the virtual router therein,
wherein the virtual switch switches packets communicated in the first scope,
wherein the virtual router routes packets communicated outside of the cloud network.

6. The cloud network system of claim 5, wherein
virtual switches are configured to switch a data link layer communication for packets communicated between virtual machines generated by hypervisors classified as a corresponding scope and a data link layer communication for delivering a packet received from an outside of the corresponding scope to at least one of the virtual machines generated by the hypervisors classified as the corresponding scope; and
virtual routers are configured to route a network layer communication between the corresponding scope and a different scope other than the corresponding scope and a network layer communication between the corresponding scope and the router for connecting to the outside of the cloud network.

7. An operating method of a scope controller for a cloud network, the method comprising:
receiving a packet;
determining whether the packet is:
a first packet received from one virtual machine generated by a plurality of hypervisors classified as a first scope among hypervisors classified into a plurality of scopes; or
a second packet received from an outside of the first scope;
delivering using a virtual router of the scope controller, in response to determining that the packet is the first packet, the received first packet to an inside or outside of the first scope based on a scope of an end point of the received first packet; and
delivering using a virtual switch of the scope controller, in response to determining that the packet is the second packet, the received second packet to the inside of the first scope,
wherein the first scope includes the virtual switch and the plurality of hypervisors,
wherein the virtual switch and the virtual router are dedicated to the first scope and the plurality of hypervisors,
wherein the plurality of hypervisors of the first scope are associated with only one virtual switch, and
wherein the scope controller includes the virtual switch and the virtual router.

8. The operating method of claim 7, wherein the delivering of the received first packet comprises:
identifying the scope of the end point of the received first packet through an end point database of the scope controller;
switching, in response to identifying that the end point of the received first packet is the first scope, the received first packet to a virtual machine of the first scope corresponding to the end point using the virtual switch of the scope controller; and
routing, in response to identifying that the end point of the received first packet is a different scope other than the first scope or the outside of the cloud network, the received first packet to the different scope or a router for a connection with the outside of the cloud network using the virtual router of the scope controller.

9. The operating method of claim 7, wherein the delivering of the received second packet comprises switching the received second packet to one of the virtual machines using the virtual switch of the scope controller.

10. The operating method of claim 7, wherein:
the first packet comprises a packet in a data link layer, and
the second packet comprises a packet in a network layer.

11. The operating method of claim 10, wherein the communication of the data link layer is isolated and processed within each of the plurality of scopes.

12. A non-transitory computer-readable storage medium comprising a program code which, when executed, is configured to perform the method of claim 1 in a computer.

13. A non-transitory computer-readable storage medium comprising a program code which, when executed, is configured to perform the method of claim 7 in a computer.

* * * * *